(12) United States Patent
Miller et al.

(10) Patent No.: US 6,529,570 B1
(45) Date of Patent: Mar. 4, 2003

(54) DATA SYNCHRONIZER FOR A MULTIPLE RATE CLOCK SOURCE AND METHOD THEREOF

(75) Inventors: Steven C. Miller, Livermore, CA (US); Michael B. Galles, Los Altos, CA (US); David M. Parry, San Jose, CA (US); Jon C. Gibbons, San Francisco, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/409,768

(22) Filed: Sep. 30, 1999

(51) Int. Cl.[7] .................................................. H04L 7/00
(52) U.S. Cl. .......................... 375/354; 375/355; 375/371
(58) Field of Search ................................. 375/354, 355, 375/357, 371; 709/232

(56) References Cited

U.S. PATENT DOCUMENTS

| | | | | |
|---|---|---|---|---|
| 5,060,239 A | * | 10/1991 | Briscoe et al. | 370/465 |
| 5,388,250 A | * | 2/1995 | Lewis et al. | 327/141 |
| 5,768,529 A | | 6/1998 | Nikel et al. | 395/200.62 |
| 5,870,446 A | * | 2/1999 | Mc Mahan et al. | 370/516 |
| 6,003,096 A | * | 12/1999 | Lee | 345/501 |

* cited by examiner

*Primary Examiner*—Stephen Chin
*Assistant Examiner*—David B. Lugo
(74) *Attorney, Agent, or Firm*—Baker Botts L.L.P.

(57) ABSTRACT

A data synchronizer (60) receives a data ready signal (40) at a selector (82). The selector (82) selects either the data ready signal (40) or a delayed version of the data ready signal (40) in response to a speed select signal (88) determined according to a clock speed of a receive core clock (52). The selector (82) provides a select signal (92) to a first latch unit (94) and a second latch unit (96). The first latch unit (94) generates a latched select signal (A) that is provided as a receive data valid signal (48) by a signal generator (108) in response to a slow clock rate for the receive core clock (52). The second latch unit (96) generates a delayed select signal (B) that is used by the signal generator (108) to remove an extra width inserted into the latched select signal (A) prior to providing the receive data valid signal (48) in response to a fast clock rate for the receive core clock (52).

18 Claims, 2 Drawing Sheets

DATA SYNCHRONIZER FOR A MULTIPLE RATE CLOCK SOURCE AND METHOD THEREOF

TECHNICAL FIELD OF THE INVENTION

The present invention relates in general to computer system data protection and more particularly to a data synchronizer for a multiple rate clock source and method thereof.

BACKGROUND OF THE INVENTION

For data synchronization, transmitting units in computer systems typically send out a data ready signal to the receiving unit to let the receiving unit know that data is available to be received. The receiving unit typically runs off its own core clock and thus data must be synchronized to the core clock upon receipt in the receiving unit. However, the speed of the core clock in the receiving unit may be significantly faster than the transmit clock, especially if the core clock rate is adjustable from one speed to another. A high ratio of core clock to transmit clock speed may cause an over sampling of the data ready signal resulting in the receiving unit receiving more than one sample of the data. Thus, accurate data may not be received and this problem may not be realized by the receiving unit. Therefore, it is desirable to avoid over sampling of the data ready signal in order to efficiently and accurately receive data.

SUMMARY OF THE INVENTION

From the foregoing, it may be appreciated that a need has arisen to prevent over sampling of a data ready signal for data transmission in a computer system. In accordance with the present invention, a data synchronizer for a multiple rate clock source and method thereof are provided that substantially eliminate or reduce disadvantages and problems associated with conventional data synchronization techniques.

According to an embodiment of the present invention, there is provided a data synchronizer for a multiple rate clock source that includes a selector unit for receiving a data ready signal and a delayed data ready signal. The selector unit generates a select signal selected from one of the data ready signal and the delayed data ready signal in response to a speed of a core clock. A first latch unit receives the select signal and generates a latched select signal in response to the core clock. A second latch unit receives the select signal and generates a delayed select signal in response to the core clock. A signal generator generates a ready signal in response to a speed of the core clock. The signal generator selects one of the latched select signal and the delayed select signal according to the speed of the core clock.

The present invention provides various technical advantages over conventional data synchronization techniques. For example, one technical advantage is to avoid over sampling of a received data ready signal. Another technical advantage is to generate a different ready signal for a specific core clock speed. Yet another technical advantage is to shape the ready signal according to the speed of the core clock. Still another technical advantage is to integrate newer and faster computer system elements with exiting older and slower products. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figures 1, 3:
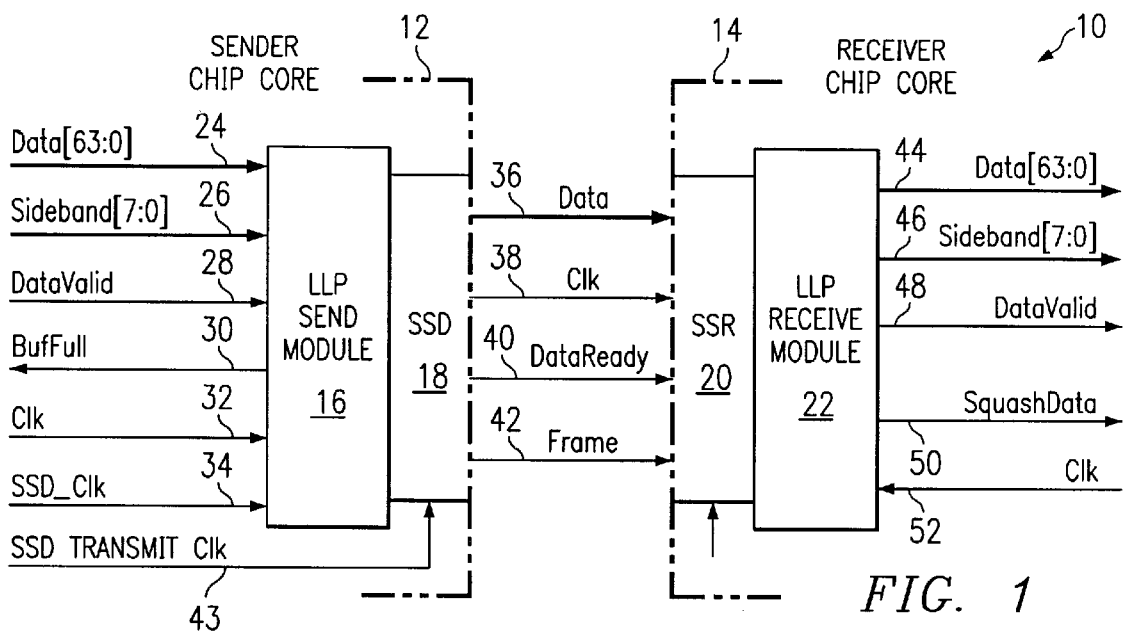
FIG. 1 illustrates a block diagram of transmit and receive units within a computer system.
FIG. 3 illustrates a timing diagram that shows operation of the data synchronizer.

FIG. 1 is a block diagram of a computer system 10. Computer system 10 includes a transmit element 12 and a receive element 14. Transmit element 12 includes a send module 16 and a source synchronous driver 18. Receiver element 14 includes a source synchronous receiver 20 and a receive module 22.

In operation, send module 16 receives transmit data information 24 and transmit sideband information 26 from the core of transmit element 12. The core of transmit element 12 also sends a transmit data valid signal 28 to send module 16 to indicate the presence of valid data for data information 24 and sideband information 26. Send module 16 provides a buffer full signal 30 to the core of transmit element 12 to indicate that send module 16 cannot receive anymore transmit data information 24 or transmit sideband information 26 for the time being. Send module 16 may operate from a transmit core clock 32 and/or a synchronous source driver clock 34. Source synchronous driver 18 processes transmit data information 24, transmit sideband information 26, and transmit data valid signal 28 for transmission over a data bus line 36, a clock signal line 38, and a data ready signal 40. Source synchronous driver 18 may also provide a frame signal 42 to identify a frame of data carried over data bus line 36. Source synchronous driver 18 transmits according to a driver transmit clock 43.

At receiver element 14, source synchronous receiver 20 receives information carried over data bus line 36, clock signal line 38, data ready signal 40, and frame signal 42. Receive module 22 processes information from source synchronous receiver 20 in order to generate receive data information 44, receive sideband information 46, receive data valid signal 48, and squash data signal 50. Receive module 22 operates according to a receive core clock 52. Send module 16 and receive module 22 are used to guarantee error free delivery of data from the core of transmit element 12 to the core of receive element 14.

Figure 2:
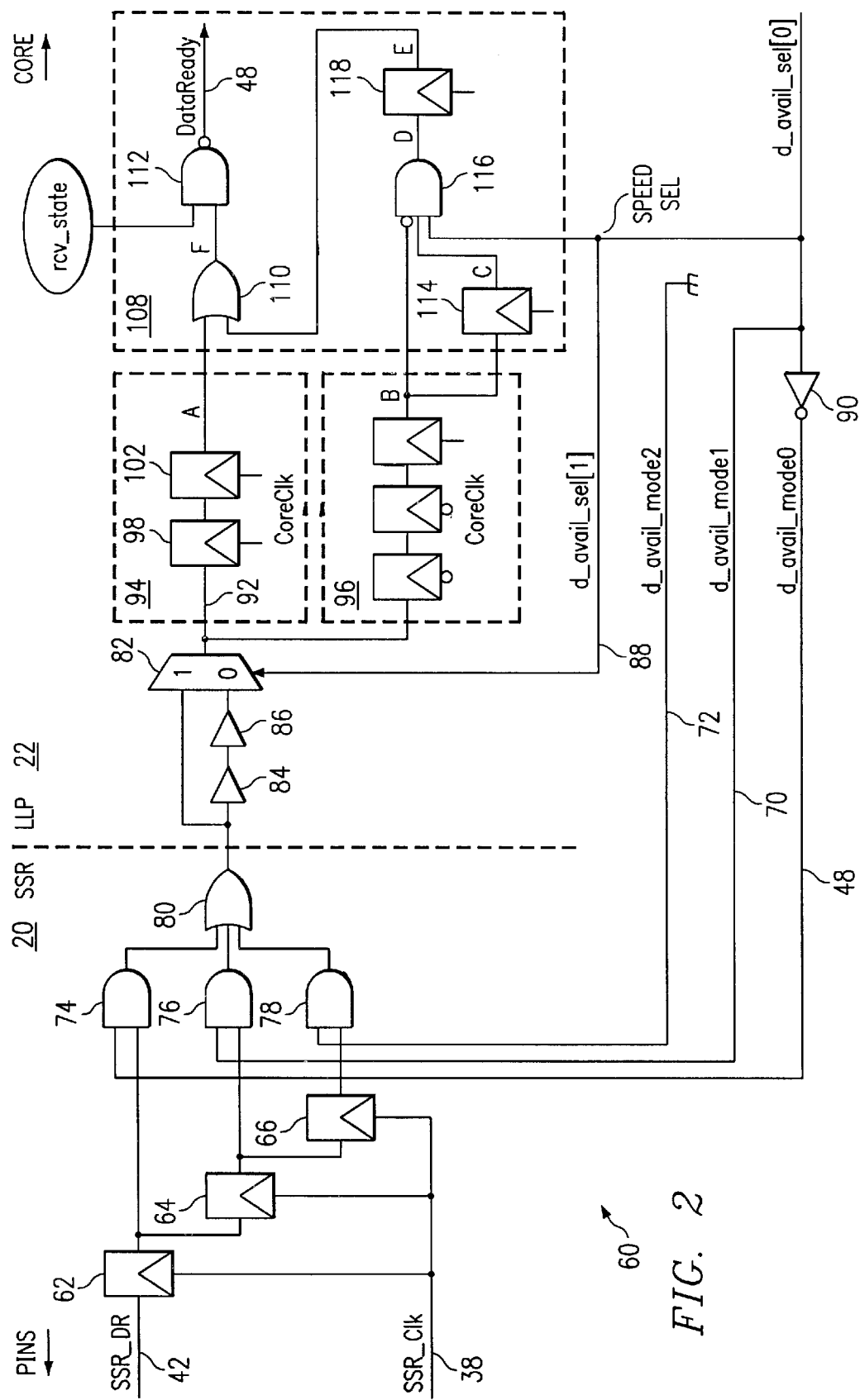
FIG. 2 illustrates a block diagram of a data synchronizer in the receive unit of the computer system.

FIG. 2 is a block diagram of a data synchronizer 60 in receive module 22. Data synchronizer 60 insures error free delivery of data by avoiding over sampling of data ready signal 40 within receive element 14. Data ready signal 40 is processed by source synchronous receiver 20. Source synchronous receiver 20 generates three different delayed versions of data ready signal 40 using latches 62, 64, and 66. The specific version of data ready signal 40 provided to receive module 22 is determined in response to whether a good packet of data has been received according to mode signals 68, 70, and 72. Mode signals 68, 70, and 72 drive AND gates 74, 76, and 78 respectively so that the proper data ready signal is output from OR gate 80. When receive core clock 52 is equal to or less than driver transmit clock 43, than mode0 mode signal 68 is used as there is no risk of underrunning the receive buffers. When receive core clock 52 is significantly greater than driver transmit clock 43, mode1 mode signal 70 is used to prevent buffer underrun. Mode2 mode signal 72 is provided as an optional feature.

The appropriate version of data ready signal 40 enters data synchronizer 60 at a selector 82 directly and through double driver delays 84 and 86. Selector 82 selects one of the two types of data ready signals as a select signal 92 in response to a speed select signal 88 generated according to a speed of receiver core clock 52. Speed select signal 88 also drives mode signal 68 directly and mode signal 70 through inverter 90 to determine which of the three versions of data ready signal 40 is to enter data synchronizer 60. Selector 82 provides select signal 92 to a first latch unit 94 and a second latch unit 96. First latch unit 92 generates a latched select signal A using a first latch 98 and a second latch 100 triggered by a rising edge of receive core clock 52. Second latch unit 96 generates a delayed select signal B using a first latch 102 and a second latch 104 triggered by a trailing edge of receive core clock 52 and a third latch 106 triggered by a rising edge of receive core clock 52.

Latched select signal A and delayed select signal B are processed by a signal generator 108. Signal generator 108 generates receive data valid signal 48 through an OR gate 110 and a NAND gate 112. When speed select signal 88 is set to a level zero state, indicating a receive core clock 52 speed equal to or less than the speed of driver transmit clock 43, latched select signal A is placed onto receive data valid signal 48. When speed select signal 88 is set to a level one state, indicating a receive core clock 52 speed significantly greater than the speed of driver transmit clock 43, delayed select signal is inversely ANDed with a latched version C of itself at latch 114 triggered by the rising edge of receive core clock 52 and AND gate 116. The result D of AND gate 116 is latched by latch 118 triggered by the rising edge of receive core clock 52 and provided to OR gate 110. The result E of latch 118 is ORed with latch select signal A to generate signal F, resulting in receive data valid signal 48.

FIG. 3 is a timing diagram showing operation of data synchronizer 60. The appropriate data ready signal 48 may initiate prior to a rising edge of a receive core clock 52 pulse and reset after a rising edge of a later receive core clock 52 pulse. This would generate a latched select signal A with a duration of an extra receive core clock 52 cycle beyond that of data ready signal 48. Thus, latched select signal A has a greater width than data ready signal 48. This extra width for latched select signal A in conjunction with a faster receive core clock 52 speed may result in over sampling of data by receive element 12 causing inaccurate computer system 10 operation. Second latch unit 96 and signal generator 108 effectively eliminate the extra width inserted into latched select signal A by first latch unit 94 for a faster speeds of receive core clock 52. For slower speeds of receive core clock 52, the extra width of latched select signal A has no effect on data sampling.

To remove the extra width inserted into latched select signal A, delayed select signal B is inverted and combined with a latched version C of itself to generate result D. Result D represents the extra width inserted into latched select signal A. Result D is then delayed to obtain result E in order to align this generated width to latched select signal A so that an unwanted portion of the extra width inserted into latched select signal A can be eliminated. The result F of combining result E with latched select signal A produces data valid signal 48 that begins at the same time for either of the speed selections for receive core clock 52. Thus, data valid signal 48 may be shaped so that data may be captured in more than one clock domain. In exemplary applications, receive core clock 52 may operate at either 400 MHz or 600 MHz according to design requirements.

Thus, it is apparent that there has been provided, in accordance with the present invention, a data synchronizer for a multiple rate clock source and method thereof that satisfy the advantages set forth above. Although the present invention has been described in detail, various changes, substitutions, and alterations may be made herein. For example, the exact logic in removing the extra width of the latched select signal may be accomplished in a different manner than that shown by the present invention. Also, the data synchronizer may be designed to accommodate three or more possible receive core clock operating rates. Other examples may be readily ascertainable by those skilled in the art and may be made herein without departing from the spirit and scope of the present invention as defined by the following claims.

What is claimed is:

1. A data synchronizer for a multiple rate clock source, comprising:

a selector unit operable to receive a data ready signal and a delayed data ready signal, the selector unit operable to generate a select signal selected from one of the data ready signal and the delayed data ready signal in response to a speed of a core clock;

a first latch unit operable to receive the select signal, the first latch unit operable to generate a latched select signal in response to the core clock;

a second latch unit operable to receive the select signal, the second latch unit operable to generate a delayed select signal in response to the core clock;

a signal generator operable to generate a receive data valid signal in response to a speed of the core clock, the signal generator operable to select one of the latched select signal and the delayed select signal according to the speed of the core clock.

2. The data synchronizer of claim 1, wherein the first latch unit includes first and second latches that latch the select signal on a rising edge of the core clock in order to generate the latched select signal.

3. The data synchronizer of claim 1, wherein the second latch unit includes first and second latches that latch the select signal on a trailing edge of the core clock followed by a third latch that latches on a rising edge of the core clock.

4. The data synchronizer of claim 1, wherein the receive data valid signal is generated from the latched select signal when the core clock has a first speed, the receive data valid signal being generated from the delayed select signal when the core clock is at a second speed.

5. The data synchronizer of claim 4, wherein the second speed is greater than the first speed.

6. The data synchronizer of claim 5, wherein the first speed is 400 MHz and the second speed is 600 MHz.

7. The data synchronizer of claim 1, wherein the signal generator removes part of a pulse width of the latched select signal in response to the delayed select signal and the speed of the core clock.

8. The data synchronizer of claim 7, wherein the signal generator removes a most recent portion of the pulse width of the latched select signal.

9. The data synchronizer of claim 7, wherein the signal generator generates a signal with a pulse width equal to the part of the pulse width to be removed from the latched select signal.

10. The data synchronizer of claim 1, wherein the data ready signal is selected for receipt by the selector unit in response to the speed of the core clock.

11. A method of synchronizing data, comprising:

generating a select signal in response to receipt of a data ready signal and a delayed version of the data ready signal;

latching the select signal to obtain a latched select signal;

latching the select signal to obtain a delayed select signal;

adjusting a pulse shape of the latched select signal according to the delayed select signal in response to the core clock having a second clock rate;

outputting a receive data valid signal carrying the latched select signal in response to a core clock having a first clock rate;

outputting the receive data valid signal carrying the adjusted latched select signal in response to the core clock having the second clock rate.

12. The method of claim 11, wherein the pulse shape of the latched select signal is adjusted by removing a portion of its pulse width.

13. The method of claim 11, wherein adjusting a pulse shape of the latched select signal includes:

generating a remove signal with a pulse width from the delayed select signal;

eliminating a portion of a pulse width of the latched select signal equivalent to the pulse width of the remove signal.

14. The method of claim 11, further comprising:

receiving one of a plurality of versions of the data ready signal, the data ready signal selected for receipt being determined by the first or second clock rate of the core clock.

15. The method of claim 11, wherein the select signal is generated by selecting one of the data ready signal and a delayed version of the data ready signal in response to the first or second clock rate of the core clock.

16. The method of claim 11, further comprising:

capturing data in response to the receive data valid signal.

17. The method of claim 11, wherein the first clock rate is equal to or less than a transmit rate of the data ready signal.

18. The method of claim 11, wherein the second clock rate is greater than a transmit rate of the data ready signal.

* * * * *